United States Patent
Wippermann et al.

(10) Patent No.: US 10,732,377 B2
(45) Date of Patent: Aug. 4, 2020

(54) MULTI-APERTURE IMAGING DEVICE HAVING CHANNEL-SPECIFIC ADJUSTABILITY

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Braeuer, Schloeben (DE); Alexander Oberdoerster, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 143 days.

(21) Appl. No.: 15/898,484

(22) Filed: Feb. 17, 2018

(65) Prior Publication Data

US 2018/0172945 A1    Jun. 21, 2018

Related U.S. Application Data

(63) Continuation of application No. PCT/EP2016/069653, filed on Aug. 18, 2016.

(30) Foreign Application Priority Data

Aug. 19, 2015   (DE) .................. 10 2015 215 845

(51) Int. Cl.
| | |
|---|---|
| *G02B 7/02* | (2006.01) |
| *G02B 7/08* | (2006.01) |
| *G02B 13/00* | (2006.01) |
| *G02B 26/08* | (2006.01) |
| *G02B 27/64* | (2006.01) |
| *H04N 5/225* | (2006.01) |

(52) U.S. Cl.
CPC ............ *G02B 7/08* (2013.01); *G02B 13/001* (2013.01); *G02B 26/0816* (2013.01);
(Continued)

(58) Field of Classification Search
CPC ........................................... G02B 7/08
(Continued)

(56) References Cited

U.S. PATENT DOCUMENTS

| | | |
|---|---|---|
| 5,035,472 A | 7/1991 | Hansen |
| 6,992,699 B1 | 1/2006 | Vance et al. |

(Continued)

FOREIGN PATENT DOCUMENTS

| | | |
|---|---|---|
| DE | 102013209819 A1 | 11/2014 |
| DE | 102014213371 B3 | 8/2015 |

(Continued)

OTHER PUBLICATIONS

Unknown, "Autofokus", "Autofokus—Wikipedia", Oct. 4, 2016, 1-7.

*Primary Examiner* — James C. Jones
(74) *Attorney, Agent, or Firm* — Perkins Coie LLP; Michael A. Glenn

(57) ABSTRACT

Providing a multi-aperture imaging device having a single-line array of optical channels arranged next to one another with and adjuster for channel-specifically changing a relative position between an image sensor region of a respective optical channel, the optics of the respective optical channel and a beam-deflecting device of the respective channel or for channel-specifically changing an optical characteristic of the optics of the respective optical channel or an optical characteristic of the beam-deflecting device relating to deflecting the optical path of the respective optical channel, and a storage having default values stored therein and/or a controller for converting sensor data to default values for channel-specifically controlling the adjusting device is used to reduce requirements to, for example, manufacturing tolerances of the multi-aperture imaging device and/or requirements to the multi-aperture imaging device as regards position and shape invariance relative to temperature variations (Continued)

such that the additional complexity entailed by this procedure is compensated again.

11 Claims, 6 Drawing Sheets

(52) U.S. Cl.
CPC ....... *G02B 26/0875* (2013.01); *G02B 27/646* (2013.01); *H04N 5/2254* (2013.01); *H04N 5/2258* (2013.01)

(58) Field of Classification Search
USPC .......................................................... 359/823
See application file for complete search history.

(56) References Cited

U.S. PATENT DOCUMENTS

| | | |
|---|---|---|
| 8,824,833 B2 | 9/2014 | Dagher et al. |
| 2002/0030163 A1 | 3/2002 | Zhang |
| 2007/0146530 A1 | 6/2007 | Nose |
| 2009/0122406 A1 | 5/2009 | Rouvinen et al. |
| 2009/0219402 A1 | 9/2009 | Schneider |
| 2014/0055624 A1 | 2/2014 | Gaines et al. |
| 2014/0111650 A1 | 4/2014 | Georgiev et al. |
| 2015/0109468 A1* | 4/2015 | Laroia .................. G02B 13/02 348/208.6 |
| 2015/0201128 A1 | 7/2015 | Dong |
| 2015/0215607 A1 | 7/2015 | Chou et al. |
| 2017/0059808 A1 | 3/2017 | Reimann et al. |
| 2017/0118322 A1 | 4/2017 | Chen et al. |

FOREIGN PATENT DOCUMENTS

| | | |
|---|---|---|
| JP | S60151603 A | 8/1985 |
| JP | 2002060621 A | 2/2002 |
| JP | 2002171430 A | 6/2002 |
| JP | 2008180773 A | 8/2008 |
| JP | 2016540417 A | 12/2016 |
| TW | 200943936 A1 | 10/2009 |
| WO | 2015015383 A2 | 2/2015 |

* cited by examiner

MULTI-APERTURE IMAGING DEVICE HAVING CHANNEL-SPECIFIC ADJUSTABILITY

CROSS-REFERENCE TO RELATED APPLICATIONS

This application is a continuation of copending International Application No. PCT/EP2016/069653, filed Aug. 18, 2016, which is incorporated herein by reference in its entirety, and additionally claims priority from German Application No. 10 2015 215 845.4, filed Aug. 19, 2015, which is also incorporated herein by reference in its entirety.

The present invention relates to a multi-aperture imaging device comprising a single-line array of optical channels arranged next to one another.

BACKGROUND OF THE INVENTION

Conventional cameras comprise one imaging channel which images the entire object field or total field of view. Such cameras comprise adaptive components which allow the imaging system to be adapted and thus expand manufacturing tolerances and the temperature range of usage, and/or allow automatic focusing and optical image-stabilizing functions. Multi-aperture imaging systems consist of several imaging channels which each only capture part of the total field of view.

SUMMARY

According to an embodiment, a multi-aperture imaging device may have: an image sensor; a single-line array of optical channels arranged next to one another, wherein each optical channel includes optics for projecting a partial field of view of a total field of view on a respective image sensor region of the image sensor; a beam-deflecting device for deflecting an optical path of the optical channels; adjusting means for channel-specifically changing a relative position between the image sensor region of a respective optical channel, the optics of the respective optical channel and the beam-deflecting device or for channel-specifically changing an optical characteristic of the optics of the respective optical channel or a segment of the beam-deflecting device relating to deflecting the optical path of the respective optical channel; a storage with default values stored therein and/or a controller for converting sensor data to default values for channel-specifically controlling the adjusting device; wherein the beam-deflecting device is supported to be channel-globally rotatable around a rotational axis which is parallel to a line extension direction of the single-line array; further including a first actuator for generating a rotational movement of the beam-deflecting device around the rotational axis, which is controlled by an optical image-stabilizing controller of the multi-aperture imaging device; and further including a second actuator for a translatory movement of optics of the single-line array of optical channels along the line extension direction of the single-line array, further controlled by the optical image-stabilizing controller of the multi-aperture imaging device such that image stabilization along a first image axis is caused by the translatory movement of the optics of the single-line array of optical channels and image stabilization along a second image axis is caused by generating the rotational movement of the beam-deflecting device.

According to another embodiment, a method for adjusting a multi-aperture imaging device including an image sensor, a single-line array of optical channels arranged next to one another, wherein each optical channel includes optics for projecting a partial field of view of a total field of view on a respective image sensor region of the image sensor, and a beam-deflecting device for deflecting an optical path of the optical channels, wherein the beam-deflecting device is supported to be channel-globally rotatable around a rotational axis which is parallel to a line extension direction of the single-line array, may have the steps of: reading out default values from a storage or calculating the default values from sensor data; and in dependence on sensor data in default values, channel-specifically changing a relative position between the image sensor region of a respective optical channel, the optics of the respective optical channel and the beam-deflecting device or for channel-specifically changing an optical characteristic of the optics of the respective optical channel or a segment of the beam-deflecting device relating to deflecting the optical path of the respective optical channel; generating a rotational movement of the beam-deflecting device around the rotational axis with a first actuator and controlling the first actuator by an optical image-stabilizing controller of the multi-aperture imaging device; and translationally moving optics of the single-line array of optical channels with a second actuator along the line extension direction of the single-line array, controlling the second actuator by the optical image-stabilizing controller of the multi-aperture imaging device such that image stabilization along a first image axis is caused by the translatory movement of the optics of the single-line array of optical channels and image stabilization along a second image axis is caused by generating the rotational movement of the beam-deflecting device.

An idea underlying the present invention is that providing a multi-aperture imaging device having a single-line array of optical channels arranged next to one another with adjusting means for a channel-specific change of a relative position between an image sensor region of a respective optical channel, the optics of the respective optical channel and a beam-deflecting device of the respective channel or for a channel-specific change of an optical feature of the optics of the respective optical channel or of an optical characteristic of the beam-deflecting device relating to deflecting the optical path of the respective optical channel, and with a storage with default values stored therein and/or a controller for converting sensor data to default values for a channel-specific control of the adjusting device allows reducing requirements to, for example, manufacturing tolerances of the multi-aperture imaging device and/or reducing requirements to the multi-aperture imaging device as regards position and shape invariance relative to temperature variations such that the additional complexity entailed by this procedure is compensated again. The adjusting means may be provided in addition to actuators which are controlled by an optical image-stabilizing controller of the multi-aperture imaging device and/or by a manual or automatic focus-adjusting function of the multi-aperture imaging device.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
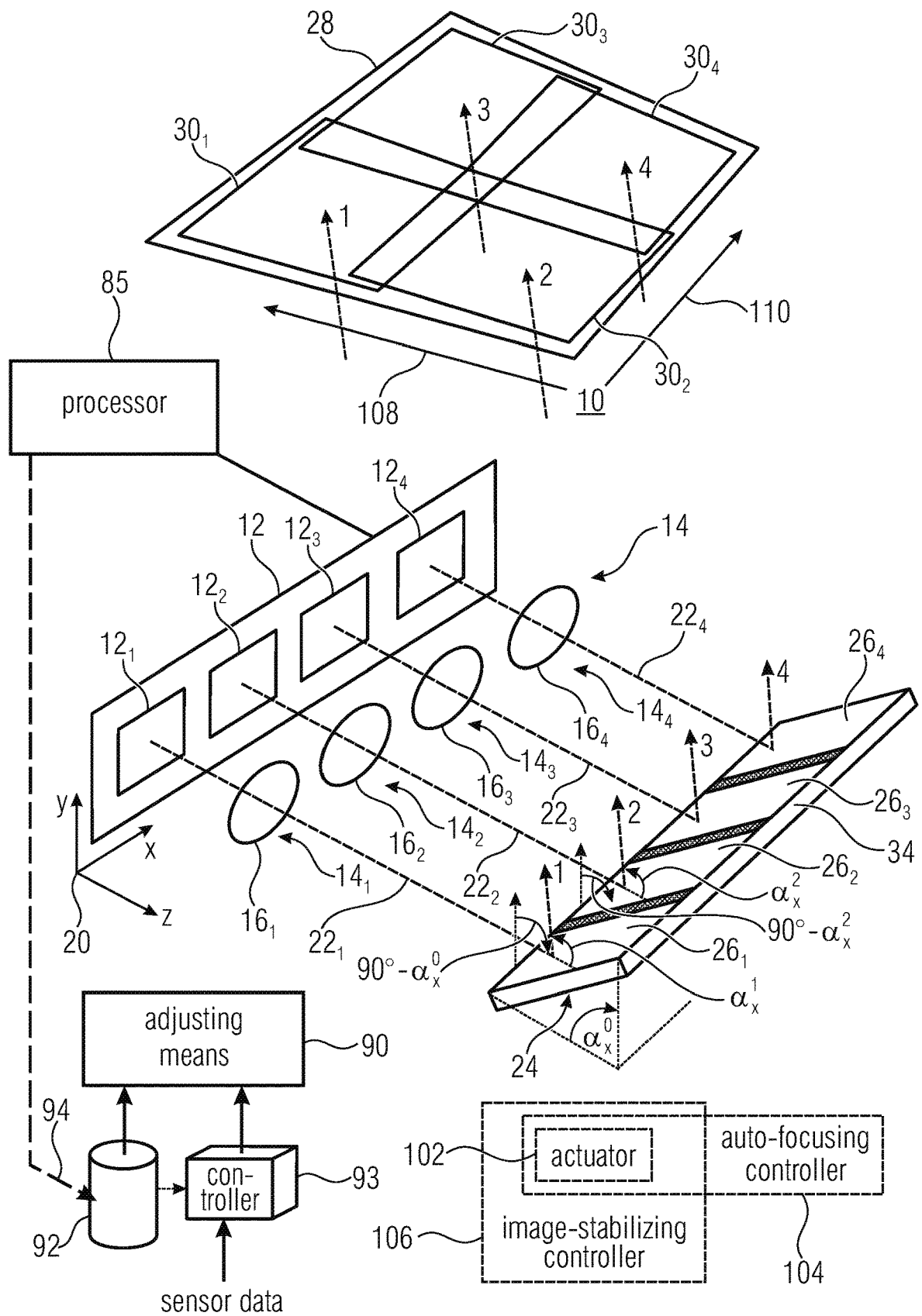
FIG. 1 shows a schematic perspective view of a multi-aperture imaging device in accordance with an embodiment.

FIG. 1 shows an embodiment of a multi-aperture imaging device. The multi-aperture imaging device 10 of FIG. 1 includes an image sensor 12 and a plurality 14 of optical channels of which each is defined by respective optics $16_1$, $16_2$, $16_3$ and $16_4$. Each optical channel $14_1$, $14_2$, $14_3$, $14_4$ projects, by means of the respective optics $16_1$-$16_4$, a channel-specific section of a total field of view of the multi-aperture imaging device 10 on a respective image sensor region $12_1$, $12_2$, $12_3$ and $12_4$, respectively, of the image sensor 12, wherein the partial fields of view overlap partly. The image sensor 12 may, for example, be a chip which comprises pixel arrays in the image sensor regions $12_1$-$12_4$. Alternatively, the image sensor 12 may comprise one pixel array chip per image sensor region $12_1$-$12_4$. It would also be conceivable for the image sensor 12 to comprise a pixel array which extends continuously over the image sensor regions $12_1$-$12_4$, i.e. a pixel array of a rectangular or other type of convex extension where the image sensor regions $12_1$-$12_4$ are located, wherein in this case only the image sensor regions $12_1$ to $12_4$ of this common continuous pixel array of the image sensor 12 are read out, for example. Different mixtures of these alternatives are of course also possible, such as, for example, the presence of one chip for two or several channels and another chip for again other channels, or the like. In the case of several chips of the image sensor 12, these may, for example, be mounted on one or several boards, such as, for example, all together or in groups or the like.

The optics $16_1$-$16_4$ each consist of a lens or a group of lenses, for example.

The image sensor regions $12_1$-$12_4$ are arranged in a common plane, i.e. the image plane of the optical channels 14 or the optics thereof. In FIG. 1, this plane is, for example, in parallel to that plane spanned or defined by an x- and a y-axis of a Cartesian coordinate system, which, in FIG. 1, is indicated for simplifying the following description and provided with the reference numeral 20.

In a plane in parallel to the image sensor 12, i.e. in parallel to the xy-plane, the optics $16_1$-$16_4$ are, for example, also arranged next to one another. In the example of FIG. 1, the relative positions of the image sensor regions $12_1$-$12_4$, in the image sensor plane, are positioned congruently to the relative positions of the optics $16_1$-$16_4$ and the optics $16_1$-$16_4$ along the x- and y-axes, i.e. laterally, relative to the image sensor 12 such that optical centers of the optics $16_1$-$16_4$ are arranged to be centered relative to centers of the image sensor regions $12_1$-$12_4$. This means that, in the example of FIG. 1, optical axes $22_1$-$22_4$ of the optical channels $14_1$-$14_4$ are parallel to one another and parallel to the z-axis of the coordinate system 20, relative to which optical axes the image sensor regions $12_1$-$12_4$ and the optics $16_1$-$16_4$ are positioned to be centered. It is pointed out that there may also be alternatives to the arrangement of the image sensor regions $12_1$-$12_4$ and the optics $16_1$-$16_4$ described so far. A divergence of the optical axes $22_1$ to $22_4$ would, for example, also be conceivable. Alternatives to an at first parallel divergence of the optical paths will be discussed further below.

The optics $16_1$-$16_4$ project objects in a scene in different, partly overlapping partial fields of view of the multi-aperture imaging device 10 on the respective image sensor regions $12_1$-$12_4$ and are positioned in a corresponding distance or in a corresponding spacing from the image sensor 12.

The plurality 14 of optical channels $14_1$-$14_4$ is illustrated as a single-line array. The optical channels $14_1$-$14_4$ are arranged next to one other along the x-axis. The x-axis thus corresponds to the line extension direction of the array 14. Also, the image sensor regions $12_1$-$12_4$ are arranged next to one another along this direction. In FIG. 1, the number of optical channels exemplarily is four, but a different number larger than two would also be possible.

In a linear array of optical channels, the extension of the multi-aperture imaging device 10, as is limited downwards by the image sensor 12 and the optics 16, along the line extension direction is greater than the diameter of a lens. The minimum extension of the multi-aperture imaging device 10, as is determined by the mutual arrangement of the image sensor 12 to optics 16 along the z-axis, i.e. along the optical axes or optical paths of the optical channels $14_1$-$14_4$, is smaller than the minimum extension along the z-axis, but due to the implementation of the optical channels $14_1$-$14_4$ as a single-line array, is larger than the minimum extension of the multi-aperture imaging device in the lateral direction y perpendicular to the line extension direction x. The y direction is determined by the lateral extension of each individual optical channel $14_1$-$14_4$, such as, for example, the extension of the optics $16_1$-$16_4$ along the y-axis, maybe including the holder 18. In this situation, depending on the application, i.e., for example, the installation of the multi-aperture imaging device into the housing of a portable device, such as, for example, of a mobile phone or the like, where the housing is very flat, it may be desirable to orient the image sensor 12 and optics $16_1$-$16_4$ such that the fields of view of the optical channels, with no beam deflection, actually are directed to directions deviating from an actually desired direction of the field of view of the multi-aperture imaging device 10. It may, for example, be desirable to install the multi-aperture imaging device 10 such that the image sensor 12 and optics 16₁-16₄ are oriented perpendicular to the largest sides or main sides of the flat housing, i.e. the optical axes 22₁-22₄ between the image sensor 12 and optics 16₁-16₄ are parallel to these main sides, while the scene to be captured is in a direction perpendicular thereto, that is in front of the one main side which, for example, is the front side and exemplarily comprises a display unit, or in front of the other main side, which is, for example, the backside of the housing.

For this reason, the multi-aperture imaging device 10 comprises a beam-deflecting device which deflects the optical paths or optical axes 22₁-22₄ of the plurality of optical channels 14 such that the total field of view of the multi-aperture imaging device 10, as viewed from the multi-aperture imaging device 10, is not in the direction of the z-axis, but elsewhere. FIG. 1 illustrates the exemplary case that the total field of view of the multi-aperture imaging device 10, after deflection, is basically along the y-axis, i.e. the deflection basically takes place in the zy-plane.

As has been described before, in the embodiment of FIG. 1, the optical axes 22₁-22₄ before or without the deflection by the beam-deflecting device 24 or at, for example, the optics 16₁-16₄, are parallel to one another, as is shown in FIG. 1, or else they deviate only slightly from this. The corresponding centered positioning of optics 16₁-16₄ and the image sensor regions 12₁-12₄ is easy to produce and favorable as regards minimizing the installation size. Parallelism of the optical paths of the optical channels also causes the partial fields of view covered by the individual channels 14₁-14_N or projected on the respective image sensor regions 12₁-12₄, without further measures, i.e. beam deflection, would overlap nearly completely. In order to cover a greater total field of view by the multi-aperture imaging device 10, another function of the beam-deflecting device 24 of FIG. 1 is providing the optical paths with a divergence such that the partial fields of view of the channels 14₁-14_N overlap one another to a lesser extent.

It is, for example, assumed that the optical axes 22₁-22₄ of the optical paths of the optical channels 14₁-14₄, before or without the beam-deflecting device 24, are parallel to one another or deviate, compared to a parallel orientation along the orientation averaged over all the channels, by less than one tenth of a minimum aperture angle of the partial fields of view of the optical channels 14₁-14_N. With no additional measures, the partial fields of view would then overlap for the most part. The beam-deflecting device 24 of FIG. 1 thus includes, for each optical channel 14₁-14_N, a reflecting facet 26₁-26₄ unambiguously associated to this channel, which are each optically planar and mutually inclined, i.e. such that the partial fields of view of the optical channels overlap to a lesser extent as regards a spatial angle and, for example, cover a total field of view which comprises an aperture angle which is, for example, greater than 1.5 times the aperture angle of the individual partial fields of view of the optical channels 14₁-14_N. In the exemplary case of FIG. 1, the mutual inclination of the reflecting facets 26₁-26₄, for example, provides for the optical channels 14₁-14_N actually arranged next to one another linearly along the x-axis to cover the total field of view 28 in accordance with a two-dimensional arrangement of the partial fields of view 30₁-30₄.

When, in the embodiment of FIG. 1, the angular deviation/deflection of the optical axes 22₁-22₄ of the optical channel 14₁-14₄ is considered in the plane spanned by the averaged direction of the optical axes before beam deflection and the averaged direction of the optical axes after beam deflection, i.e. in the xy-plane in the example of FIG. 1, on the one hand, and in the plane perpendicular to the last mentioned plane and in parallel to the averaged direction of the optical axes after beam deflection, on the other hand, the example of FIG. 1 corresponds to the exemplary case that the mean direction after beam deflection corresponds to the y-axis. On average, the optical axes of the optical channels are thus deflected by 90° in the yz-plane around the x-axis and, on average, the optical axes are not titled from the yz-plane. $\beta_x^1$, for example, refers to the inclination angle of the facet 26₁ relative to the xz-plane, measured in the yz-plane, i.e. tilting of the facet 26₁ around the x-axis relative to the xz-plane where the optical axes 22₁-22₄ are located. $\beta_x^1=0°$ corresponds to an orientation of the facet 26₁ in parallel to the xz-plane. Correspondingly, the following applies: $\alpha_x^1=2\cdot\beta_x^1$. Correspondingly, $\beta_z^1$ defines the inclination angle of the facet 26₁ relative to a plane which the inclination $\beta_x^1$ exhibits relative to the xz-plane and is in parallel to the x-axis, measured along the x-axis. Correspondingly, the following applies: $\alpha_z^1=2\cdot\beta_z^1$. The same definitions are true for the other channels: $\alpha_x^i=2\cdot\beta_x^i$, $\alpha_z^i=2\neq\beta_z^i$.

The setup of the multi-aperture imaging device 10 of FIG. 1 described so far related to a desired or momentary adjustment before or at the time of capturing a total image. The multi-aperture imaging device 10 of FIG. 1 exemplarily includes a processor 85 which unites images captured by the image sensor regions 12₁-12₄ at, for example, a same time, with the adjustments mentioned before, to form a total image which represents the scene in the total field of view 28. The algorithm which the processor 85 uses in order to unite the images projected by the optical channels 14₁-14₄ on the image sensor regions 12₁-12₄ and having been captured by the latter, or fuse same to form a total image is, for example, designed such that assumptions on keeping certain parameters of the components described before of the multi-aperture imaging device 10 are kept in order for the quality of the total image to fulfill a certain requirement or the algorithm to be applicable at all. Exemplarily, the algorithm assumes that one or several of the following assumptions are kept to:

1) The optics-to-image sensor region distances along the z-axis are equal for all optical channels 14₁-14₄;
2) The relative position of the partial fields of view 30₁-30₄ and, in particular, the overlap between same corresponds to a predetermined requirement or deviates from the latter by less than a predetermined maximum deviation.

However, for different reasons one or several of the assumptions just mentioned may not be kept to or not kept sufficiently. Reasons for not keeping may, for example, be not keeping manufacturing variances, such as, for example, imprecisions in the relative positions of the optics 16₁-16₄ to one another and relative to the image sensor 12. Manufacturing imprecisions may also include imprecision in installation of the mirror deflection device 24 and the relative positions of the facets 26₁-26₄ to one another. Additionally or as an alternative to the manufacturing-caused deviations in tolerance, temperature variations may cause one or several of the assumptions mentioned before not to apply or not to be kept sufficiently.

Up to a certain degree, the algorithm, executed by the processor 85, for uniting or fusing the images of the image sensor regions 12₁-12₄ to form the total image may compensate deviations from an optimum orientation and arrangement of the components, such as, for example, deviations of the positions of the partial fields of view 30₁-30₄ within the total field of view 28 from a set constellation of relative positions of the partial fields of view to one another. When uniting or fusing the images, the processor 85 may, for example, compensate such deviations to a certain degree. However, when exceeding certain deviation limits (not keeping to assumption 2), the processor 85, for example, would not be able to compensate the deviations.

Manufacturing the multi-aperture imaging device 10 such that the assumptions just mentioned are kept, such as, for example, over a certain temperature range, however, has a tendency of increasing the manufacturing costs for the multi-aperture imaging device. In order to avoid this, the multi-aperture imaging device 10 of FIG. 1 comprises adjusting means 90 for channel-specifically changing a relative position between the image sensor region $12_i$ of a respective optical channel $14_i$, the optics $16_i$ of the respective optical channel $14_i$ and the beam-deflecting device 24 or the corresponding segment $26_i$ thereof or for channel-specifically changing an optical characteristic $14_i$ or an optical characteristic of that segment $26_i$ of the beam-deflecting device 24 concerned in deflecting the optical path of the respective optical channel. The adjusting means 90 is controlled by default values or performs the adjusting tasks in accordance with default values. These are provided by a storage 92 and/or a controller 93, which will be discussed below.

The device 10, for example, comprises a storage 92 with default values stored therein for channel-specifically controlling the adjusting means 90. The default values may be predetermined and stored into the storage 92 by the manufacturer. In addition, as is indicated in FIG. 1 by a broken line 94, the processor 85 may be able, using evaluations of captured images of the image sensor regions $12_1$-$12_4$, such as, for example, images to be united by the processor 85 or to be fused to form a total image, to improve or update the stored default values in the storage 92. Exemplarily, the processor 85 captures a scene by adjusting the multi-aperture imaging device 10 with current stored default values using the adjusting means 90, as will be described in greater detail below. Thus, the default values are read out from the storage 92 and used by the adjusting means 90 for a channel-specific adjustment. By analyzing the images of the image sensor regions $12_1$-$12_4$ captured, the processor 85, achieves information on how the stored default values in the storage 92 just used for capturing are to be modified so as to result, with the next capturing using these improved or updated default values in a more precise or improved compliance of the above assumptions with the next capturing.

The stored default values may comprise a complete set of adjustment values, i.e. a set of adjustment values for completely adjusting the device 10. They are selected as has been described above and will be explained below so as to reduce or cancel certain channel-specific deviations of the optical characteristics of the channels from a set characteristic.

The default values may comprise several sets of adjustment values, such as, for example, one per sequence of successive temperature intervals, so that, when capturing an image, that set of adjustment values which is just suitable for a current situation will be used. Thus, the controller 93 may, for example, access or look up in the table associations between default value sets and different predetermined situations in the storage 92. For this access, the controller 93 receives sensor data which represents the current situation, such as, for example, data relating to temperature, pressure, humidity, position of the device 10 in space and/or a current acceleration or current rotational rate of the device 10, and determines from this data one of several default value sets in the storage 92, i.e. that set associated to the predetermined situation which comes closest to the current situation as described by the sensor data. The sensor data may also be gained from the image sensor data of the image sensor regions. Exemplarily, one set in the respective temperature interval of which the current temperature is located is selected by the controller 93. The default values of the selected set used for a certain image capturing by the adjusting means 90 from the storage 92 may again be updated when using optional feedback 94.

The stored default values may, for example, be configured such that a measure of a dispersion of a distribution of one or several characteristics among the optical channels is reduced by controlling the adjusting device by means of the stored default values, i.e. a transverse deviation of the partial fields of view from a regular distribution of the partial fields of view, focal lengths of the optics or depth-of-field distances of the optical channels.

Alternatively, the default values may be determined in the controller 93 without a storage 92, for example by fixedly integrating a mapping of current sensor data to suitable default values in the controller 93, for example. The mapping may be described by a functional connection between sensor data and default values. The functional connection may be adaptable by parameters. The parameters may be adapted using the feedback 94.

The storage 92 may, for example, be a non-volatile storage. It may possibly be a read-only storage, but a re-writable storage is also possible. The controller 93 and the processor 85 may be implemented in software, hardware or programmable hardware. These may be programs executed on a common microprocessor. The sensors for providing the sensor data for the controller 93 may belong to the device 10, such as, for example, the image sensor regions, or else be external components, like components of the apparatus into which the device is installed, as will be discussed below referring to the following figures.

Some possible implementations for the adjusting means 90 will be described below. The adjusting means 90 of FIG. 1 may apply to one, several or all of the implementation variations described below. Special combinations will also be detailed below.

In the variation shown, the adjusting means 90 exemplarily comprises an actuator $96_i$ for each channel $14_i$ which moves the optics $16_i$ of the corresponding channel $14_i$ in an axial direction along the optical axis $22_i$ or along the optical path and/or transverse thereto along the x-axis and/or y-axis. Alternatively, the actuator $96_i$ may, for example, also move the image sensor $12_i$. Generally, the actuator $96_i$ may cause a relative movement of the image sensor region $12_i$, optics $16_i$ and/or the corresponding segment $26_i$ of the beam-deflecting device 24.

Figure 3:
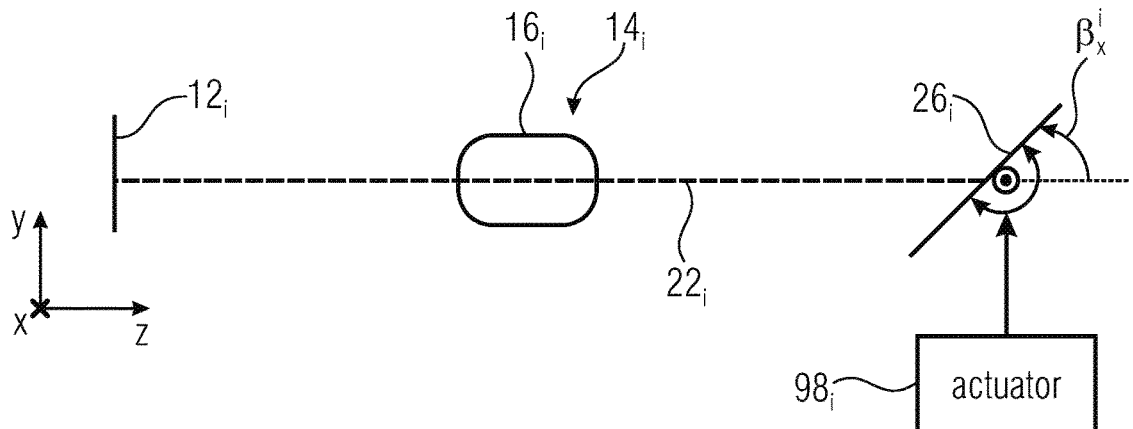
FIG. 3 shows a schematic side sectional view of one of the channels for illustrating an actuator which the adjusting means of FIG. 1 may comprise and which executes rotation of the beam-deflecting device around an axis parallel to the line extension direction.

In accordance with the variation illustrated in FIG. 3, the adjusting means 90 comprises, for each channel $14_i$ an actuator $98_i$ which changes the segment $26_i$ such as, for example, the reflecting facet of each channel $14_i$, in its angular orientation relative to the optical axis $22_i$, i.e. the setting angle $\beta_x^i$. It is to be mentioned here that the segment $26_i$ is not limited to a reflecting facet as indicated in FIG. 1. Each segment $26_i$ may also be implemented as a prism which deflects the direction of the optical axis $22_i$ in the yz-plane, while the optical path of the optical channel $14_i$ passes through the prism.

Figure 2:
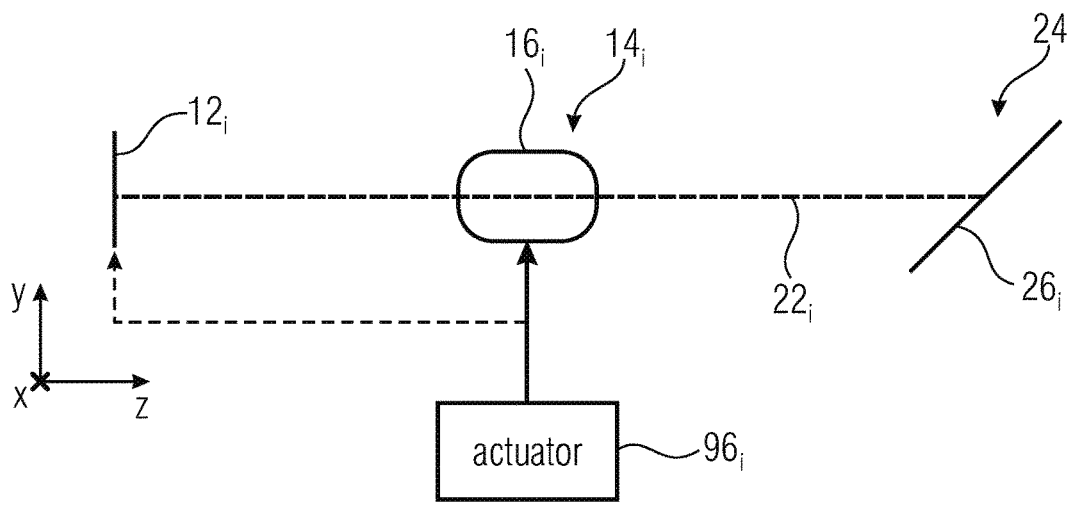
FIG. 2 shows a schematic side sectional view of one of the channels for illustrating an actuator which the adjusting means of FIG. 1 may comprise and which performs a channel-specific relative movement between the image sensor region, optics and/or a beam-deflecting device segment of the respective channel.

For realizing the relative movements by the actuators $96_i$ and $98_i$ of FIG. 2 and FIG. 3, respectively, i.e. for generating the movement of the optics $16_i$, which may, for example, implemented in a translatory manner, as well as for tilting the segment $26_i$ by the actuator $98_i$ and the x-axis, a pneumatic, hydraulic, piezoelectric, thermal, electrostatic or electrodynamic drive or a DC or stepper motor or a voice-coil drive may, for example, be used.

Figure 4:
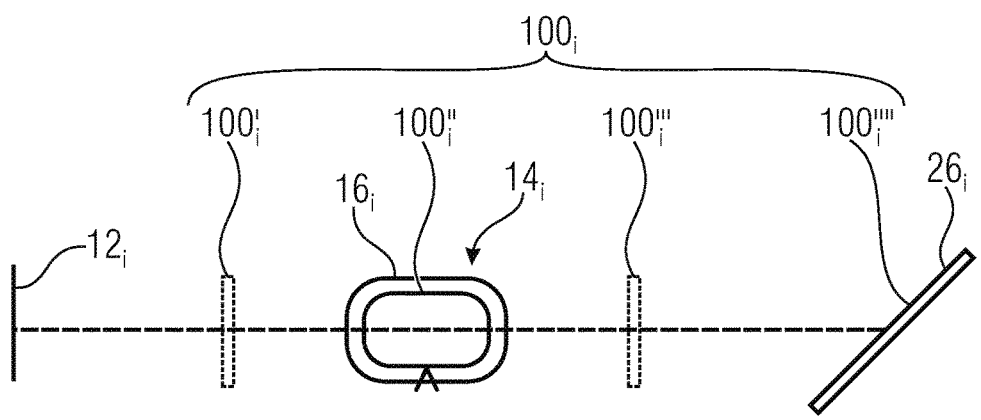
FIG. 4 shows a schematic side sectional view of one of the optical channels in order to illustrate a phase-change element which the adjusting means of FIG. 1 may comprise.

In accordance with a further variation which FIG. 4 refers to, the adjusting means 90 comprises a phase-changing optical element or phase change element $100_i$ for each channel $14_i$ which, as is indicated in FIG. 4, may be integrated into the respective optics $16_i$ ($100_i''$), integrated into the segment $26_i$ ($100_i''''$), between image sensor region $12_i$ and optics $16_i$ ($100_i'$) or between optics $16_i$ and beam-deflecting device segment $26_i$ ($100_i'''$), wherein combinations of the variations mentioned before are also possible. The phase-changing optical element $100_i$ may, for example, cause a location-dependent change in a refraction index, such as, for example, by liquid crystals. Alternatively or additionally, the phase-changing optical element $100_i$ causes a change in the shape of an optically active surface, for example by using piezos, which have a mechanical effect on flexible, solid, transparent materials and cause deformation, or by using the electro wetting effect. The phase change element $100_i''$ may, for example, change the refraction index of the optics $16_i$. Alternatively, the phase change element $100_i''$ may change a shape of an optical lens area of the optics $16_i$ and thereby change the effective refractive power of the optics $16_i$. The phase change element $100_i''''$ may, for example, generate a sinusoidal phase grid on an optically relevant surface of the segments $26_i$, such as, for example, on the reflective facet, in order to cause virtual tilting of the corresponding surface. Similarly, the phase change element $100_i'$ or the phase change element $100_i'''$ may deflect the optical axis.

Expressed in other words, the phase change caused by the phase-changing optical element $100_i$ may be largely rotationally symmetrical, such as, for example, rotationally symmetrical around the optical axis $22_i$, and thus, in the case of $100_i''$, cause a change in the focal length of the optics $16_i$, for example. The phase change caused by the element $100_i$ may, however, also be largely linear, such as, for example, linear along the x-axis or linear along the y-axis, in order to cause a change in the deflection angle or deflection of the optical axis $22_i$ in the corresponding direction.

The rotationally symmetrical phase change may be used for focusing, and the linear phase change for correcting the position of the partial field of view of the corresponding optical channel $14_i$.

The actuators $96_i$, $98_i$ and $100_i$ introduced referring to FIGS. 2 to 4 are representative for other kinds of actuators. There may be one of each kind per channel $14_i$, wherein these would be controllable individually and separately by the default values in the storage and/or the present current image sensor data, data of further sensors, for example for temperature, pressure, humidity, position in space, acceleration and others, are also considered. As has been mentioned, only one or part of the actuators illustrated may be present in a device 10 and an actuator present may alternatively be present in at least one or in at least two channels for individually adapting the respective channel.

Mixtures would, of course, also be possible, which mixtures would then cause a deflection and change in focal length at the same time.

Referring back to FIG. 1, the broken lines indicate that the multi-aperture imaging device 10 optionally, in addition to the adjusting means 90, may comprise one or several actuators 102 for generating a channel-global relative movement, i.e. equal for all optical channels $14_1$-$14_4$, between the image sensor 12, optics array 14 and beam-deflecting device 24. The one or the several additional actuators 102 may, as is indicated in FIG. 1, be part of an optionally present auto-focusing controller 104 and/or an optionally present image-stabilizing controller of the multi-aperture imaging device.

Figure 5:
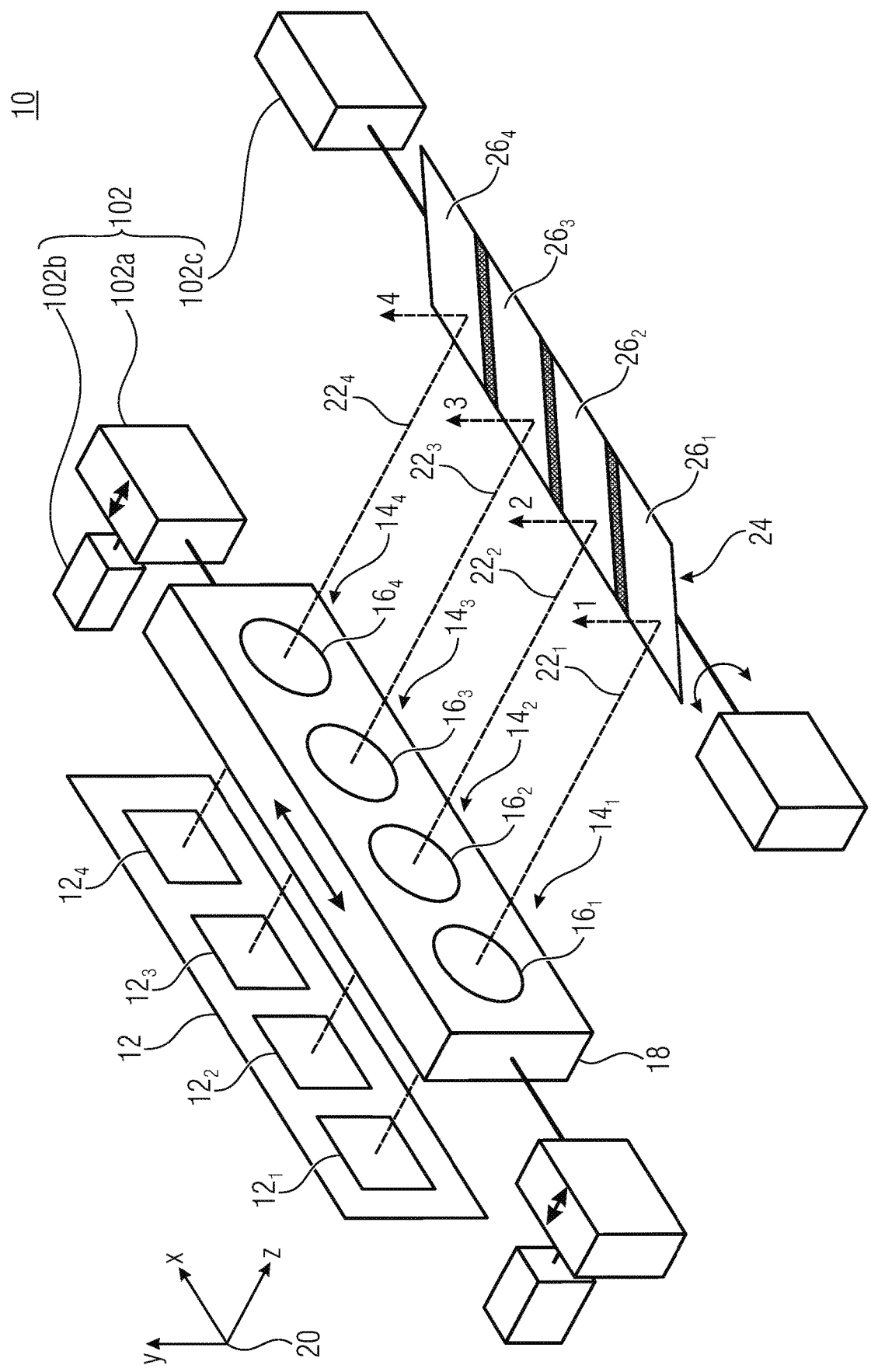
FIG. 5 shows a schematic perspective view of a multi-aperture imaging device, wherein, while omitting the adjusting means and the storage and/or the controller and the image-stabilizing controller and autofocusing controlling of FIG. 1, for illustration purposes, specific examples of potential additional actuators are illustrated which may be present in addition to the means of FIG. 1 and are, for example, part of an image-stabilizing controller or autofocusing controller of the multi-aperture imaging device.

A specific example of a device 10 of FIG. 1 supplemented by additional actuators is shown in FIG. 5. FIG. 5 shows the multi-aperture imaging device 10 of FIG. 1, wherein the optics $16_1$-$16_4$ of the optical channels $14_1$-$14_4$ are fixed to one another mechanically via a common carrier 18. The common carrier 18 may, for example, as is illustrated in FIG. 5, be a transparent substrate where the optics $16_1$-$16_4$ are formed, such as, for example, molding, gluing or the like, wherein the optical paths or optical axes $22_1$-$22_4$ pass through the substrate 18. Alternatively, it is also possible for the carrier 18 to be a carrier formed, for example, from a non-transparent material, which comprises, for each channel $14_1$-$14_4$, an opening where the $16_1$-$16_4$ associated to the respective channel is fixed. Using this common holder, it is possible to subject the optics $16_1$-$16_4$ to a global movement equal for all channels, such as, for example, by a translatory movement of the carrier 18 in the x-direction, i.e. along the line extension direction of the array 14. An actuator 102a is provided here. This means that the actuator 102a generates a translatory movement of the optics $16_1$-$16_4$ which is equal for all optical channels $14_1$-$14_4$ by the actuator 102a subjecting the common carrier 18 to the translatory movement along the x-axis. Regarding the type of actuator 102a, reference is made to the examples made reference to referring to FIGS. 2 and 3. In addition, the device 10 of FIG. 5 includes an actuator 102b for a channel-global, i.e. equal for all optical channels $14_1$-$14_4$, change in the image sensor-$12_i$-to-optics-$16_i$-distance along the z-axis or along the optical axis $22_i$. As is indicated in FIG. 5, the actuator 102b, for example, subjects the optics $16_1$-$16_4$ to the translatory movement along the z-axis for changing the distance from the associated image sensor portions $12_1$-$12_4$ not via the carrier 18, but also via the actuator 102a which is thus also subjected to the translatory movement along the z-axis and in a way serves as a suspension for the carrier 18.

In addition, the device 10 of FIG. 5 includes an actuator 102c for rotating the beam-deflecting device 24 around an axis which is parallel to the x-axis or lies within the plane where the optical axes $22_1$-$22_4$ are located, or not far from same. Regarding the actuators 102b and 102c, relating to possible implementation examples, reference is made to the listing of examples having been provided before referring to FIGS. 2 and 3. The rotational movement or rotatory movement imparted on the beam-deflecting device 24 by the actuator 102c, has the same effect on the segments $26_1$ to $26_4$ of the beam-deflecting device 24 for all channels $14_1$-$14_4$, i.e. is of a channel-global nature. The beam-deflecting device may, for example, be a facet mirror or a prism having corresponding segments $26_1$-$26_4$.

Using the actuator 102b, the autofocusing controller 104 is, for example, able to control the focus of capturing by the device 10 by means of the channels $14_1$-$14_4$ in a channel-global manner. The image-stabilizing controller 106 is able to stabilize the total field of view 28 in a first direction 108 by means of the actuator 102c and in a perpendicular direction 110 by means of the actuator 102a so as to avoid shaking by a user, for example.

The device 10 of FIG. 5 here exemplarily comprises, for each channel $14_1$-$14_4$, an actuator in accordance with FIG. 2, i.e. an actuator $96_i$ for each channel $14_i$, in order to subject the image sensor regions $12_1$-$12_4$ to a translatory movement along the x-axis and/or along the y-axis in a channel-specific manner so as to compensate manufacturing imprecision or temperature-induced drifts of the partial fields of view within the total field of view, for example. The device 10 of FIG. 5 may, alternatively or additionally, comprise an actuator $100_i''$ for compensating differences in focal length of the optics $16_1$ to $16_4$, which occur undesirably due to manufacturing. In addition or alternatively, the device 10 of FIG. 5 may comprise an actuator $100_i'''$ for compensating deviations of the relative inclinations of the segments $26_1$-$26_4$ caused by manufacturing or temperature, among one another such that the relative inclinations result in the desired coverage of the total field of view 28 by the partial fields of view $30_1$-$30_4$. Additionally or alternatively, the device 10 may finally comprise actuators of the type $100_i'$ or $100_i'''$.

In summary, the device 10 may thus comprise an actuator 102c configured to rotate the beam-deflecting device 24 around an axis which is in parallel to the line extension direction x of the array 14. The rotational axis is, for example, located in the plane of the optical axes $22_1$-$22_4$ or distant from same by less than a fourth of a diameter of the optics $16_1$-$16_4$. Alternatively, it would of course also be possible for the rotational axis to be further away, for example by less than an optics diameter or less than four optics diameters. The actuator 102c may, for example, be provided in order to rotate the beam-deflecting device 24 at a short response time in only a small angular range, such as, for example, within a span of less than 5° or less than 10°, in order to compensate shaking of the multi-aperture imaging device 10 by the use during capturing, for example. In this case, the actuator 102c would, for example, be controlled by the image-stabilizing controller.

Alternatively or additionally, the actuator 102c could be configured to alter in its direction the total field of view 28 which is defined by the total coverage of the partial fields of view $30_1$-$30_4$ (FIG. 1), at larger angular shifts. Thus, it would also be possible for rotating the beam-deflecting device 24 to achieve deflections where the total field of view is arranged in the opposite direction relative to the device 10, for example by implementing the beam-deflecting device 24 to be a mirror array reflective on both sides.

Alternatively or additionally, the device 10 may also comprise an actuator 102a configured to move the optics $16_1$-$16_4$ by means of the substrate 18 or the substrate 18 itself and, thus, the optics $16_1$-$16_4$ in a translatory manner along the line extension direction. The actuator 102a may, for example, also be controlled by the image-stabilizing controller mentioned before in order to achieve image stabilization transverse to the image stabilization realized by rotating the mirror-deflecting device 24, by the movement 53 along the line extension direction.

Additionally or alternatively, the device 10 may further comprise an actuator 102b for changing the image-side distance between image sensor 12 and optics $16_1$ to $16_4$ or between image sensor 12 and body 18 so as to achieve adjusting of the depth of field. The means 54 may be controlled by a manual user controller or by an autofocusing controller of the device 10.

The actuator 102a also serves for suspending the substrate 18 and, as is indicated in FIG. 5, arranged laterally next to the substrate 18 along the line extension direction in order not to increase the structural height. For the actuators 102b and 102c, it is also true that the same are arranged in the plane of the optical paths in order not to increase the structural height.

It is to be pointed out that the optics $16_1$ to $16_4$ may be held in a constant relative position, not only among one another, such as via the transparent substrate already mentioned, but also relative to the beam-deflecting device, such as using a suitable frame which does not increase the structural height and thus is located in the plane of the components 12, 14 and 24 or in the plane of the optical paths. The constancy of the relative position may be limited to the distance between optics and the beam-deflecting device along the optical axes so that the actuator 102b, for example, moves the optics $16_1$ to $16_4$ together with the beam-deflecting device 24 in a translatory manner along the optical axes. The optics-to-beam deflecting device distance may also be set to a minimum distance such that the optical path of the channels is not limited laterally by the segments of the beam-deflecting device 24, which reduces the structural height, since otherwise the segments $26_i$ would have to be dimensioned for the largest optics-to-beam deflecting device distance as regards the lateral extension in order not to confine the optimal path. Additionally, the constancy of the relative position could mean that the frame mentioned previously holds to each other the optics and the beam-deflecting device along the x axis in a rigid manner such that the actuator 102a would move the optics $16_1$ to $16_4$ together with the beam-deflecting device in a translatory manner along the line extension direction.

The beam-deflecting device 24 for deflecting the optical path of the optical channels described above, in connection with the actuator 102c for generating the rotational movement of the beam-deflecting device 24 and the actuator 102a of an optical image-stabilizing controller of the multi-aperture imaging device 10 allows image or total image field stabilization in two dimensions, i.e. image stabilization along a first image axis which is basically parallel to the line extension direction by the translatory movement of the substrate 18, and image stabilization along a second image axis which is basically parallel to the optical axes before or without beam deflection, or when considering the deflected optical axes perpendicular to the optical axes and the line extension direction, by generating the rotational movement of the beam-deflecting device 24. In addition, the arrangement described may cause a translatory movement of the beam-deflecting device fixed in the mentioned frame and of the array 14 perpendicularly to the line extension direction, such as, for example, by the actuator 54 described, which may be used for realizing focus adjustment and, thus, an autofocusing function.

For the sake of completeness, it is to be pointed out that the device, when capturing via the image sensor regions, captures an image of a scene per channel imaged to the image sensor regions through the channels, and that the device may optionally comprise a processor, such as, for example, the processor 85, which unites or fuses the images to form a total image which corresponds to the scene in the total field of view, and/or provides additional data, such as, for example, 3D image data and depth information on the object scene for forming depth charts and for a software-technological realization, such as, for example, re-focusing (determining the areas of sharpness after the actual capturing), all-in-focus images, virtual green screen (separation of foreground and background) and others. The latter tasks could also be performed by said processor or externally. However, the processor may also represent a component external to the multi-aperture imaging device.

Figure 6:
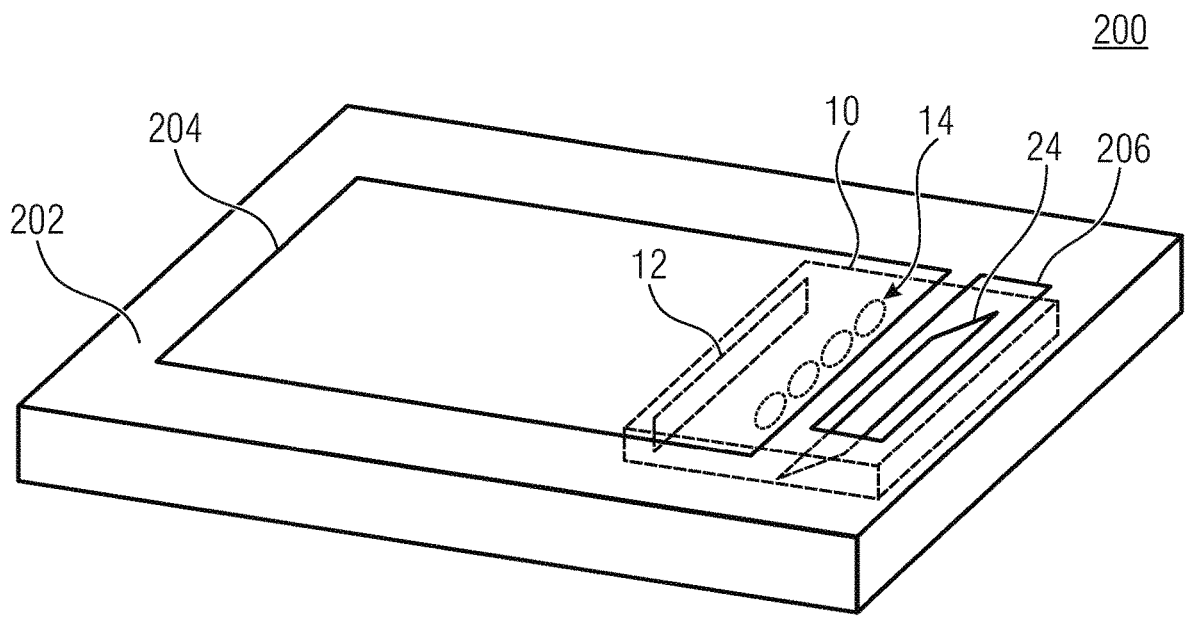
FIG. 6 shows a perspective view of a mobile apparatus for illustrating installation of the multi-aperture imaging device.
Figure 7:
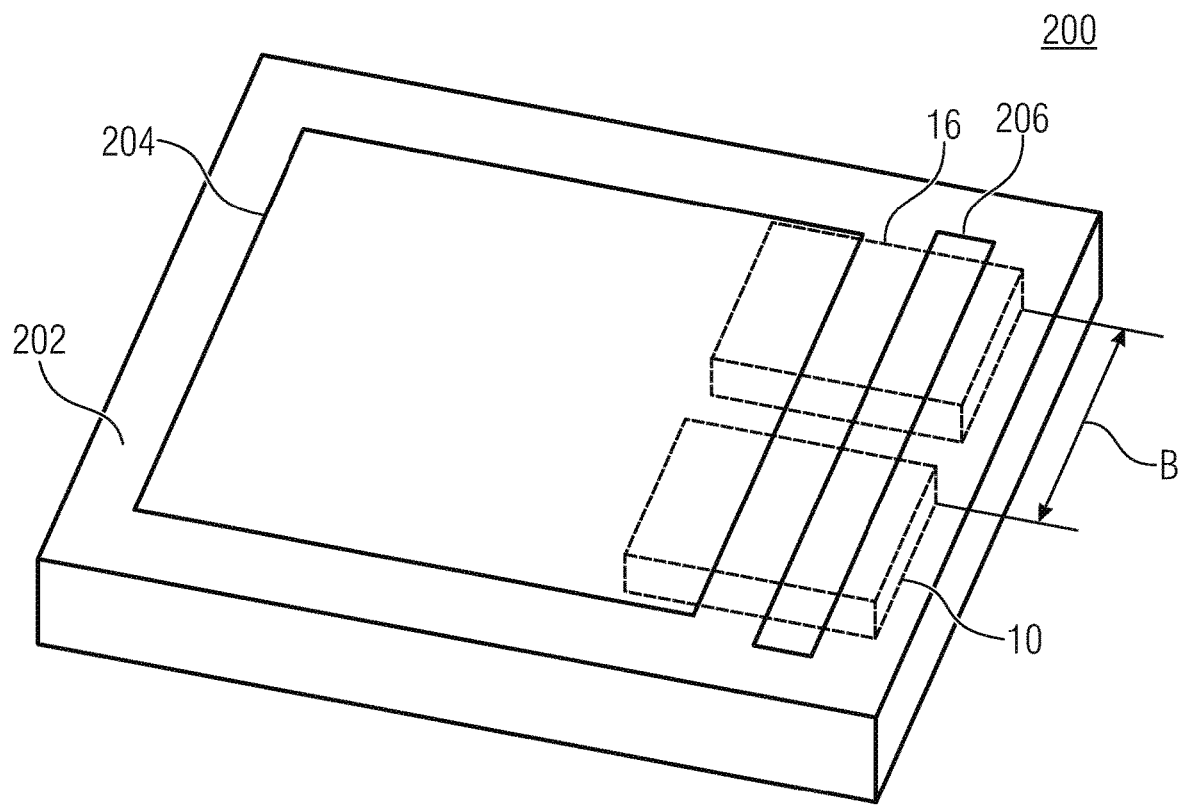
FIG. 7 shows a perspective view of a mobile apparatus for illustrating installation of two multi-aperture imaging devices for the purpose of stereoscopy.

FIG. 6 illustrates that devices 10 of the alternatives described so far may, for example, be installed in a flat housing of a portable apparatus 200, such as, for example, of a mobile phone, smart phone or media player or the like, wherein in this case the planes of the image sensor 12 or the image sensor regions and the lens planes of the optics of the channels 14 are, for example, oriented to be perpendicular to the flat extension direction of the flat housing or in parallel to the thickness direction. In this way, the beam-deflecting device 24 would, for example, provide for the total field of view of the multi-aperture imaging device 10 to be arranged in front of a front side 202 of the flat housing which, for example, also comprises a screen. Alternatively, such a deflection would also be possible where the field of view would be located in front of a back side of the flat casing opposite the front side 202. The housing may comprise a transparent window 206 in the penetrated side 202 so as to transmit optical paths of the optical channels 14. Additionally, switchable diaphragms (moved mechanically, electrochromic) could be attached so as to influence the entrance of light through the opening of the window on the front and/or back side. The housing of the apparatus 200 or the apparatus itself may be flat since the structural height of the device 10, which is in parallel to the thickness of the housing, may be kept small by the illustrated position of the device 10 in the housing. Switchability may also be provided for by providing a window on that side opposite the side 202 and, for example, moving the beam-deflecting device between two positions, for example in that the latter is executed as a mirror mirroring on the front and back sides, as has been shown in FIG. 9, and rotating same from one to the other position, or as a facet mirror comprising a set of facets for the one position and another set of facets for the other position, wherein the sets of facets are arranged next to one another in the line extension direction and a translatory back and forth movement of the beam-deflecting device along the line extension direction causes switching between the positions. Installation of the device 10 in another, maybe non-portable, apparatus such as, for example, a car, would, of course, also be possible. FIG. 7 shows that several modules 10 of which the partial fields of view of their channels cover the same field of view completely or, optionally, even in a congruent manner may be installed, for example, in the apparatus 200 with a basic distance B among one another along a line extension direction which is equal for both modules, for example for the purpose of stereoscopy. More than two modules would also be conceivable.

The line extension directions of the modules 10 may not be co-linear but only parallel to one another. However, it is to be mentioned again that, as has already been mentioned, a device 10 or module may also be equipped with channels such that the same in groups each cover the same total field of view completely.

It has already been pointed out above that the optical paths or optical axes may deviate from parallelism before or beam deflection. This situation will be described below in that the channels may be provided with a kind of pre-divergence. Using this pre-divergence of the optical axes $22_1$-$22_4$, it would be possible that, for example, not all the facet inclinations differ, but that some groups of channels exemplarily comprise the facets of equal inclination. The latter may then be formed integrally or merging into one another continuously, i.e. as a facet associated with this group of channels neighboring in the line extension direction. The divergence of the optical axes of these channels may then originate from the divergence of these optical axes, as is achieved by a lateral offset between optical centers of the optics and image sensor regions of the channels. Pre-divergence may, for example, be limited to one plane. Exemplarily, the optical axes, before or without beam-deflection, may be in one common plane, however, in a divergent manner, and the facets cause only additional divergence in the other transversal plane, i.e. they are all parallel to the line extension direction and only inclined to one another differently to the common plane of the optical axes mentioned before, wherein again several facets may include the same inclination or may commonly be associated to a group of channels the optical axes of which, before or without beam deflection, differ, for example, in pairs already in the common plane of the optical axes mentioned before.

Figure 8A:
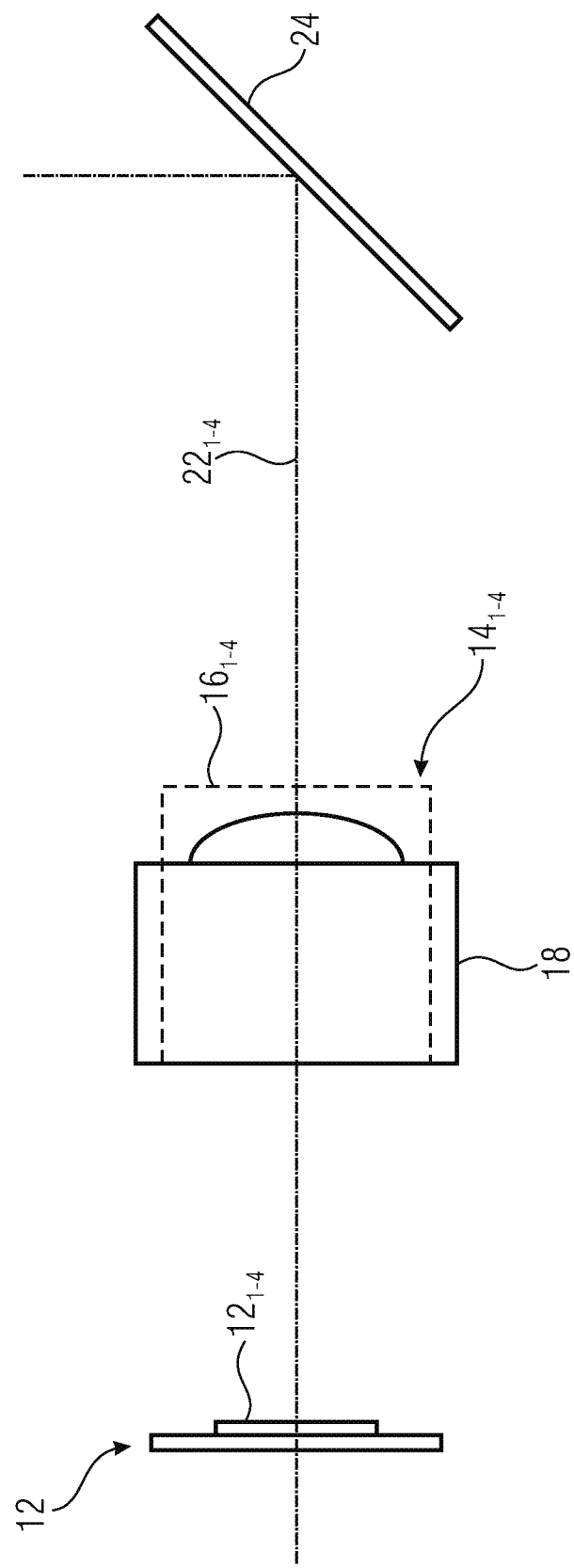
FIGS. 8a and 8b show a side sectional view and a top view, respectively, of a multi-aperture imaging device in accordance with a variation of FIG. 1, wherein the optical axes of the channels exhibit a pre-divergence so as to pass in a divergent manner in a common plane in parallel to the line extension direction such that the number of facets of paired different inclination may be reduced.
Figure 8B:
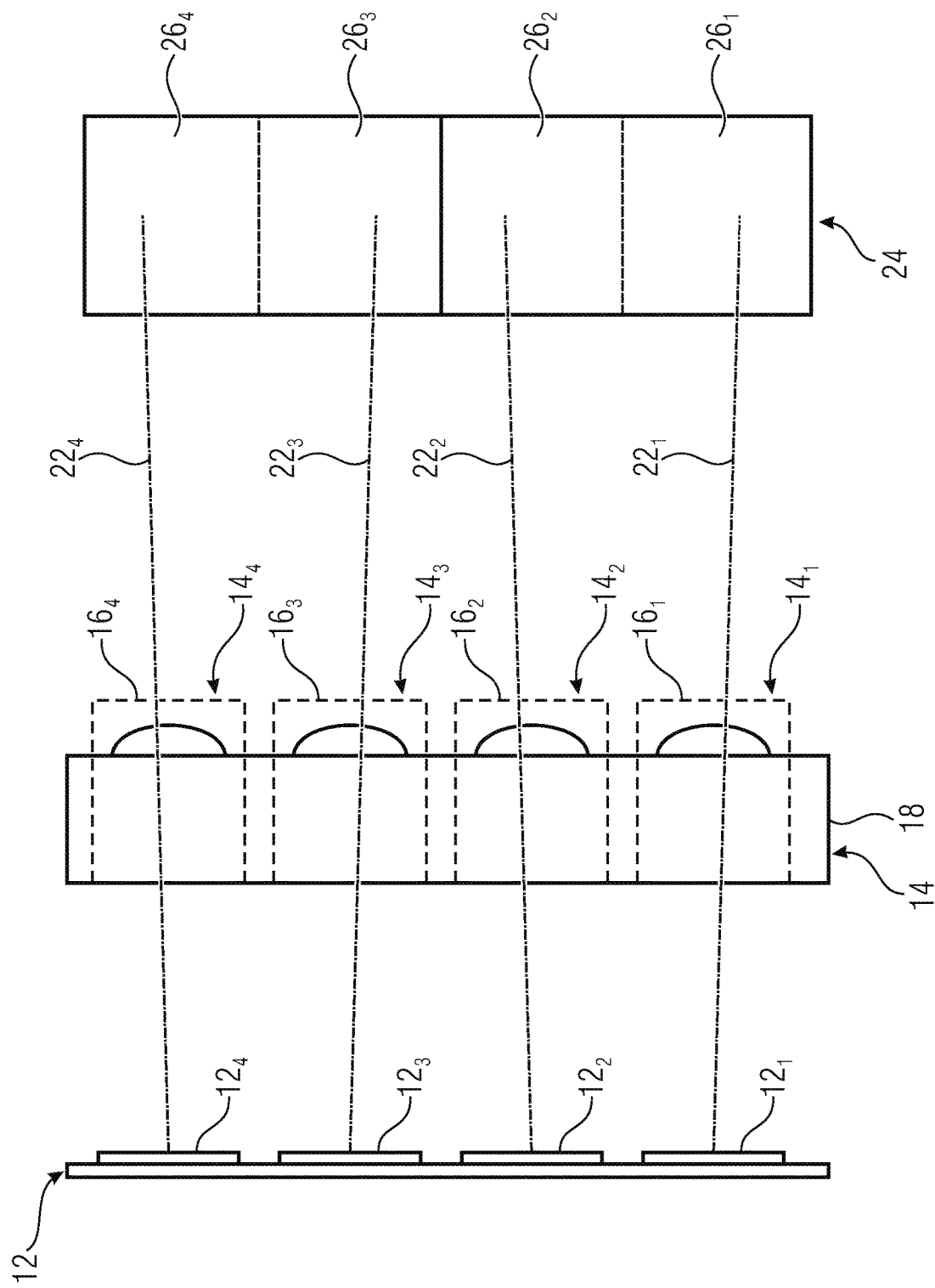

The pre-divergence maybe present and mentioned above may, for example, be achieved by the optical centers of the optics to be located on a straight line along the line extension direction, whereas the centers of the image sensor regions are arranged to be deviating from the projection of the optical centers along the normal of the plane of the image sensor regions on points on a straight line in the image sensor plane, such as, for example, at points which deviate from the points on the straight line mentioned before in the image sensor plane in a channel-specific manner along the line extension direction and/or along the direction perpendicular to both the line extension direction and the image sensor normal. Alternatively, pre-divergence may be achieved by the centers of the image sensors being located on a straight line along the line extension direction, whereas the centers of the optics are arranged to be deviating from the projection of the optical centers of the image sensors along the normal of the plane of the optical centers of the optics on points on a straight line in the optics central plane, such as, for example, at points deviating from the points on the straight line mentioned before in the optics central plane in a channel-specific manner along the line extension direction and/or along the direction perpendicular to both the line extension direction and to the normal of the optics central plane. It is advantageous for the channel-specific deviation from the respective projection mentioned before to be located solely in the line extension direction, i.e. for the optical axes to be located only in a common plane with pre-divergence being used. Both the optical centers and the image sensor region centers will then be located on a straight line in parallel to the line extension direction, but at different intermediate distances. A lateral offset between lenses and image sensors in a perpendicular lateral direction to the line extension direction, in contrast, would result in a larger structural height. A pure in-plane offset in the line extension direction does not change the structural height, but fewer facets may result and/or the facets may comprise only a tilt in an angular orientation, thereby making the structure easier. This is illustrated exemplarily in FIGS. 8a and 8b for the case of the optics in accordance with FIG. 5 held on a common carrier, where the neighboring channels $14_1$ and $14_2$ on the one hand and the neighboring channels $14_3$ and $14_4$ comprise optical axes $14_1$ and $14_2$ and $14_3$ and $14_4$, respectively, located in the common plane, but squinting relative to each other, i.e. being provided with a pre-divergence. The facets $26_1$ and $26_2$ may be formed by a facet and the facets $26_3$ and $26_4$ may be formed by another facet, as is shown by broken lines between the respective pairs of facets, and the only two facets are inclined only in one direction and are both in parallel to the line extension direction.

In addition, it may be provided for that some optical channels are associated to the same partial field of view, for example for the purpose of super-resolution or increasing the resolution using which the corresponding partial field of view is sampled by these channels. The optical channels within such a group would then, for example, be parallel before beam deflection and would be deflected to a partial field of view by a facet. Advantageously, pixel images of the image sensor of a channel of a group would be located in intermediate positions between images of the pixels of the image sensor of another channel of this group.

Not for super-resolution purposes, but only for stereoscopy purposes, for example, an implementation would be conceivable where a group of directly neighboring channels in the line extension direction cover the total field of view completely with their partial fields of view, and another group of mutually directly neighboring channels also cover the total field of view completely.

Above embodiments may thus be implemented in the form of a multi-aperture imaging device, with a single-line channel arrangement, wherein each channel transmits a partial field of view of a total field of view and the partial fields of view overlap partly. A structure having several such multi-aperture imaging devices for stereo, triple, quadruple, etc. structures for 3D image capturing is also possible. The plurality of modules may thus be implemented as a contiguous line. The contiguous line may use identical actuators and a common beam-deflecting element. One or several enforcing substrates maybe located in the optical path may extend over the entire line which may form a stereo, triple, quadruple structure. Super-resolution methods may be used, wherein several channels image the same sub-image regions. The optical axes may be divergent already without any beam-deflecting device so that fewer facets are needed on the beam-deflecting unit. The facets then advantageously comprise only a single angular component. The image sensor may be a single piece, comprise only one contiguous pixel matrix or several interrupted ones. The image sensor may be composed of many sub-sensors which are, for example, arranged next to one another on a conductive board. An autofocusing drive may be configured such that the beam-deflecting element is moved synchronously with the optics, or is idle.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture imaging device comprising:
   an image sensor;
   a single-line array of optical channels arranged next to one another, wherein each optical channel comprises optics for projecting a partial field of view of a total field of view on a respective image sensor region of the image sensor;
   a beam-deflecting device for deflecting an optical path of the optical channels;
   and adjuster for channel-specifically changing a relative position between the image sensor region of a respective optical channel, the optics of the respective optical channel and the beam-deflecting device or for channel-specifically changing an optical characteristic of the optics of the respective optical channel or a segment of the beam-deflecting device relating to deflecting the optical path of the respective optical channel;
   a storage with default values stored therein and/or a controller for converting sensor data to default values for channel-specifically controlling the adjusting device;
   wherein the beam-deflecting device is supported to be channel-globally rotatable around a rotational axis which is parallel to a line extension direction of the single-line array;
   further comprising a first actuator for generating a rotational movement of the beam-deflecting device around the rotational axis, which is controlled by an optical image-stabilizing controller of the multi-aperture imaging device; and
   further comprising a second actuator for a translatory movement of optics of the single-line array of optical channels along the line extension direction of the single-line array, further controlled by the optical image-stabilizing controller of the multi-aperture imaging device such that image stabilization along a first image axis is caused by the translatory movement of the optics of the single-line array of optical channels and image stabilization along a second image axis is caused by generating the rotational movement of the beam-deflecting device.

2. The multi-aperture imaging device in accordance with claim 1, wherein the adjuster comprises:
   for at least one, for at least two or for each channel, a first actuator for moving the optics of the respective channel transversely and/or longitudinally to the optical path of the respective channel.

3. The multi-aperture imaging device in accordance with claim 1, wherein the adjuster comprises:
   for at least one, for at least two or for each channel, a phase-change element for changing the local distribution of the refraction index or a shape of an optical surface of the optics of the respective optical channel or the segment of the beam-deflecting device relating to deflecting the optical path of the respective optical channel.

4. The multi-aperture imaging device in accordance with claim 1, wherein the adjuster comprises:
   for at least one, for at least two or for each channel, a second actuator for tilting the segment of the beam-deflecting device relating to deflecting the optical path of the respective optical channel.

5. The multi-aperture imaging device in accordance with claim 1, which, in addition to the adjuster, comprises an actuator for generating a channel-global relative movement between the image sensor, the single-line array and the beam-deflecting device.

6. The multi-aperture imaging device in accordance with claim 5, wherein the actuator present in addition to the adjuster is part of an autofocusing controller or an image-stabilizing controller of the multi-aperture imaging device.

7. The multi-aperture imaging device in accordance with claim 1, further comprising a third actuator for a translatory movement of optics of the plurality of optical channels along the optical paths of the plurality of optical channels.

8. The multi-aperture imaging device in accordance with claim 7, wherein the third actuator is controlled by a focus controller of the multi-aperture imaging device.

9. The multi-aperture imaging device in accordance with claim 1, wherein the default values are configured such or in the controller a mapping of current sensor data to suitable default values is fixedly integrated such that the controller is configured such that a measure of a dispersion of a distribution of one or several characteristics among the optical channels is reduced by controlling a adjusting device by means of the stored default values:
   a transversal deviation of the partial fields of view from a regular distribution of the partial fields of view,
   focal lengths of the optics,
   depth-of-field distances of the optical channels.

10. The multi-aperture imaging device in accordance with claim 1, wherein the default values or conversion by the controller exhibit/s a dependence on image sensor data of the image sensor regions and/or data of sensors relating to temperature, pressure, humidity, spatial position of the multi-aperture imaging device and/or acceleration of the multi-aperture imaging device and/or rotational rate of the multi-aperture imaging device.

11. A method for adjusting a multi-aperture imaging device comprising an image sensor, a single-line array of optical channels arranged next to one another, wherein each optical channel comprises optics for projecting a partial field of view of a total field of view on a respective image sensor region of the image sensor, and a beam-deflecting device for deflecting an optical path of the optical channels, wherein the beam-deflecting device is supported to be channel-globally rotatable around a rotational axis which is parallel to a line extension direction of the single-line array, the method comprising:

reading out default values from a non-volatile storage or calculating the default values from sensor data; and in dependence on sensor data in default values, channel-specifically changing a relative position between the image sensor region of a respective optical channel, the optics of the respective optical channel and the beam-deflecting device or for channel-specifically changing an optical characteristic of the optics of the respective optical channel or a segment of the beam-deflecting device relating to deflecting the optical path of the respective optical channel;

generating a rotational movement of the beam-deflecting device around the rotational axis with a first actuator and controlling the first actuator by an optical image-stabilizing controller of the multi-aperture imaging device; and translationally moving optics of the single-line array of optical channels with a second actuator along the line extension direction of the single-line array, controlling the second actuator by the optical image-stabilizing controller of the multi-aperture imaging device such that image stabilization along a first image axis is caused by the translatory movement of the optics of the single-line array of optical channels and image stabilization along a second image axis is caused by generating the rotational movement of the beam-deflecting device.

* * * * *